US012073827B2

(12) United States Patent
Aggarwal et al.

(10) Patent No.: US 12,073,827 B2
(45) Date of Patent: Aug. 27, 2024

(54) PRE-EMPTIVELY LIMITING RESPONSIVENESS OF VARIOUS ASSISTANT DEVICES IN AN ENVIRONMENT USING AN INAUDIBLE TONE OR OTHER RENDERED OUTPUT

(71) Applicant: Google LLC, Mountain View, CA (US)

(72) Inventors: Vikram Aggarwal, Palo Alto, CA (US); Moises Morgenstern Gali, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 766 days.

(21) Appl. No.: 17/251,479

(22) PCT Filed: Feb. 26, 2020

(86) PCT No.: PCT/US2020/019845
§ 371 (c)(1),
(2) Date: Dec. 11, 2020

(87) PCT Pub. No.: WO2021/173127
PCT Pub. Date: Sep. 2, 2021

(65) Prior Publication Data
US 2021/0335348 A1    Oct. 28, 2021

(51) Int. Cl.
*G10L 15/18*    (2013.01)
*G10L 15/22*    (2006.01)
(Continued)

(52) U.S. Cl.
CPC .......... *G10L 15/1815* (2013.01); *G10L 15/22* (2013.01); *G10L 15/26* (2013.01); *G10L 25/78* (2013.01); *G10L 2015/223* (2013.01)

(58) Field of Classification Search
CPC ..... G10L 15/1815; G10L 15/22; G10L 15/26; G10L 25/78; G10L 2015/223
See application file for complete search history.

(56) References Cited

U.S. PATENT DOCUMENTS

| 10,169,985 B1 * | 1/2019 | Rader ..................... G08C 23/02 |
| 10,902,855 B2 * | 1/2021 | Min ........................ G06F 3/167 |

(Continued)

OTHER PUBLICATIONS

European Patent Office; International Search Report and Written Opinion of PCT Ser. No. PCT/US2020/019845, 12 pages; Nov. 18, 2020.

(Continued)

*Primary Examiner* — Brian L Albertalli
(74) *Attorney, Agent, or Firm* — Gray Ice Higdon

(57) ABSTRACT

Implementations set forth herein relate providing and/or detecting an automated assistant suppressing output for limiting responsiveness of an automated assistant that is available via another computing device. The output can be rendered as an inaudible tone in an environment, in order to pre-emptively suppress responses from automated assistants that may detect a forthcoming spoken utterance from a user. Limiting responsiveness in this way can preserve computational resources in environments, such as vehicles, in which multiple users may be carrying devices that are capable of being invoked via a spoken utterance. For instance, pre-emptively limiting responsiveness of other automated assistants can eliminate interruptions at devices that may other be inadvertently invoked as a result of detecting certain spoken utterances.

20 Claims, 8 Drawing Sheets

(51) Int. Cl.
*G10L 15/26* (2006.01)
*G10L 25/78* (2013.01)

(56) References Cited

U.S. PATENT DOCUMENTS

| | | | |
|---|---|---|---|
| 11,522,619 B2 * | 12/2022 | Shoop | H04B 7/15521 |
| 2014/0222436 A1 | 8/2014 | Binder et al. | |
| 2015/0371650 A1 * | 12/2015 | Narayan | H04B 11/00 |
| | | | 704/500 |
| 2016/0104480 A1 | 4/2016 | Sharifi | |
| 2016/0260431 A1 | 9/2016 | Newendorp et al. | |
| 2017/0345422 A1 | 11/2017 | Yang | |
| 2020/0082816 A1 * | 3/2020 | Mahajan | G10L 15/30 |
| 2021/0151047 A1 * | 5/2021 | VanBlon | G06F 16/90332 |
| 2021/0225374 A1 * | 7/2021 | Cherukkate | G10L 15/22 |

OTHER PUBLICATIONS

Intellectual Property India; Examination Report issued in Application No. 202227046779; 6 pages; dated Nov. 17, 2022.

* cited by examiner

PRE-EMPTIVELY LIMITING RESPONSIVENESS OF VARIOUS ASSISTANT DEVICES IN AN ENVIRONMENT USING AN INAUDIBLE TONE OR OTHER RENDERED OUTPUT

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, an automated assistant may operate in a variety of different contexts in which multiple different users are present with their own respective assistant device. In such contexts, such as within a vehicle, a user may provide a request to their respective vehicle assistant, but the request may be acknowledged by one or more other assistant devices within the vehicle. This can be in part because some assistant devices may solely rely on whether a respective assistant device heard a user say a command in order to be responsive. As a result, the adaptability of the automated assistant devices to certain multi-assistant environments can be limited. For instance, the user may accidentally affect an ongoing action being performed by another assistant device with which they did not intend to communicate. As a result, the user may be required to repeat their previous spoken utterance—and possibly cause another user to remedy any unintended effects on the other assistant device that the user accidentally communicated with. For instance, such intended effects can result from incidentally initializing operations such as downloading content, verifying identity for a payment, and/or launching an application.

Unfortunately, in response to accidentally affecting another assistant device, memory allocated for any affected operations may be reused by other operations, and when a user subsequently re-invokes an interrupted action, the assistant device may have to acquire any relevant data again. Such seemingly redundant consequences can waste network resources because, for example, some spoken utterances may be processed by natural language models that are accessible via a network connection. Furthermore, any data relevant to an inadvertently canceled action would have to be re-downloaded in furtherance of completing the action, and any energy wasted from canceling an energy-intensive action (e.g., controlling a display, heating elements, and/or motorized appliances) may not be recoverable.

SUMMARY

Implementations set forth herein relate to rendering, by a computing device, an output that is detectable by other computing device(s) in an environment and that, when detected by the other computing device(s), causes the other computing device(s) to pre-emptively limit performance of certain processing of audio data detected via corresponding microphone(s). For example, the other computing device(s) can, responsive to detecting the output, at least temporarily prevent performance of: performing invocation phrase/hotword detection based on the audio data, performing voice activity detection based on the audio data, performing speech recognition based on the audio data, and/or transmitting the audio data. For instance, invocation phrase detection can be prevented at the other computing device(s) so long as the other computing devices are detecting the output (e.g., based on regularly or irregularly checking that the output is still being detected). As a result, computational resource(s) at the other computing device(s) can be conserved through at least temporary prevention of invocation phrase detection, which can be more computationally burdensome than detecting the output. For example, detecting the output can be based on checking at regular or irregular intervals (e.g., every five seconds) whereas invocation phrase detection can be continuous. As another example, detecting the output can be performed using a machine learning model or digital filter that occupies less memory and/or requires less processing resources than utilization of a invocation phrase/hotword detection model.

By causing the other computing device(s) to pre-emptively limit performance of certain processing of audio data in response to detecting certain output, the computing device causing the output to be provided can effectively be designated as solely responsive to automated assistant inputs. For example, when the output causes limiting of hotword detection, the computing device can be the only one that is responsive to a hotword that invokes an automated assistant, such as "OK Assistant" or other hotword(s). In some implementations, the computing device can initialize rendering of the output in response to determining that one or more other computing devices are nearby the computing device. The output can be rendered in a way that does not distract user(s) in the environment, such as by rendering audible output with a frequency (or frequencies) that is greater than a maximum frequency that is audible by a human (e.g., frequency or frequencies greater than 20 kHz). In some implementations, the output can embody a waveform having one or more different frequencies. In some implementations, the output can embody one or more irregular and/or non-periodic waveforms.

In some implementations, effectively pre-emptively designating a particular device as being responsive to automated assistant commands can prevent users from inadvertently invoking assistant device(s) associated with other user(s), and can prevent corresponding wasteful usage of resources of such assistant device(s). For example, friends that frequently ride in a car together may accidentally invoke each other's automated assistant without any mechanism to pre-emptively suppress the affected automated assistants. As a result, when a driver issues a command intended solely for their vehicle's automated assistant, the command may accidentally be acknowledged and responded to by other automated assistants located in the vehicle (e.g., by other cell phones and/or tablets brought into the vehicle by persons other than the driver). Accidental invocation of different automated assistants can waste battery power, considering many devices activate their display and/or other feature(s) in response to detecting an automated assistant command, regardless of whether the command was intentional. Furthermore, when an automated assistant employs an external server to process spoken inputs, accidental invocation can also waste network bandwidth on metered networks, as a result of accidentally sending audio data over network connections of multiple devices. Moreover, when a CPU must initialize from a low-power state, additional power can be wasted on the initialization of the CPU from a throttled state.

An example of a scenario in which such resources can be preserved is when multiple persons are located in an environment in which each respective user is carrying an assistant-enabled device. The environment can be an office, and the persons can be co-workers that are viewing a presentation at a particular computing device, such as a smart television, that provides access to an automated assistant. When the particular computing device detects a presence of one or more users and/or one or more assistant-enabled devices, the particular computing device can render an output that is detectable to the assistant-enabled devices. The rendered output, when detected by the other assistant-enabled devices, can cause those assistant-enabled devices to bypass and/or limit responding to user commands that are directed to an automated assistant.

For example, when a presenter of the presentation provides a spoken command to the automated assistant that is accessible via the smart television, while the smart television is rendering the output, the automated assistant will be invoked. However, because of the rendered output, the other automated assistants provided via the other assistant-enabled devices will not be invoked—or at least will not perform one or more actions in furtherance of fulfilling a request embodied in the spoken command. For instance, a presenter provides a spoken command such, "Assistant, show me my calendar," which can refer to an action that may be executable by each of the assistant-enabled devices being carried by audience members. However, because the smart television is providing the rendered output that is being detected by the other assistant-enabled devices in the environment, only the smart television will respond to the spoken command. In other words, because the smart television is providing the rendered output (e.g., an inaudible tone), each assistant-enabled device that is being carried by a respective audience member will not operate to fulfill the request (e.g., each of the other assistant enabled devices will not render a calendar at their respective display interface).

In some implementations, an output provided by a computing device, to designate itself as responsible for responding to assistant commands, can embody information that can be processed by a receiving computing device. For example, the output can embody a request for a respective automated assistant of the receiving computing device to be unresponsive. For instance, the output can embody the request by virtue of being at a particular frequency, within a particular frequency range, being a sequence of particular frequencies, or being a sequence of frequencies each within a corresponding frequency range. In some implementations, the request can be embodied in audio that that is transmitted at frequencies that are audible and/or inaudible to a human ear. In some implementations, the audio can be void of natural language content, but can embody data that can be interpreted as a computing device as a request to suppress assistant invocation. In other implementations, the audio can embody natural language content, such as the word "cancel," and/or any other word(s) that can express an unwillingness of a user to interact with their automated assistant. This can be beneficial when a particular computing device is attempting to designate itself as being solely responsive to assistant commands in an environment where a third party device is present and not compliant with such designations. The particular computing device will still be able to assign itself as solely responsive to assistant commands in the environment by pre-emptively "canceling" any attempts for other automated assistants (e.g., a third party automated assistant) to completely respond to the assistant commands. For instance, a third party automated assistant that is invoked by the spoken command from the presented may begin to respond to the spoken command by initializing a calendar application (e.g., "Ok, here is your . . . "). However, because the "cancel" command is also embodied in the rendered output from the smart television (e.g., via an inaudible tone), the third party automated assistant can receive the cancel command and close the calendar application in response (e.g., "Ok, here is your . . . [action canceled]"). It is noted that, in various implementations, multiple disparate outputs can be provided, with each being particularized to causing limiting of audio data processing for different device(s). For example, a first frequency (or first frequencies) can be provided that causes limiting of audio data processing for certain first assistant devices and a second frequency (or second frequencies) can be provided that causes limiting of audio data processing for certain second assistant devices. As another example, a first frequency (or first frequencies) can be provided that causes limiting of audio data processing for certain first assistant devices and a second non-human audible output provided that includes "cancel" or other natural language content to cause limiting of audio data processing for certain second assistant devices. When multiple disparate outputs are provided they can overlap at least partially, or can be provided in a non-overlapping manner.

In some implementations, a user can elect to allow their respective assistant-enabled device to not be suppressed by an output being rendered by another computing device. For example, when a computing device detects that another computing device is rendering an output in order to designate the other computing device as solely responsive to assistant commands, the computing device can provide an indication to a user. For instance, the indication can be a graphical element rendered at a display interface of the computing device, an audible sound rendered by an audio interface of the computing device, and/or any other output that can be acknowledged by a user. When the user acknowledges the indication, the user can provide an input to their respective assistant-enabled device in order to void any suppressive effect the rendered output may have on their respective assistant-enabled device. For example, when the user is in a public space, such as an office building, where an assistant suppressing tone is being emitted by a nearby computing device, the user can receive an indication from their respective assistant-enabled device. The user can provide an input to their automated assistant such as, "Assistant, remain responsive while I'm in this building," in order to establish a setting in which the automated assistant will remain responsive within a particular location—despite the rendered output being detected by the automated assistant. Thereafter, their respective assistant-enabled device can remain responsive to assistant commands at that particular location, but can optionally be suppressed by other output being rendered outside of the particular location.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
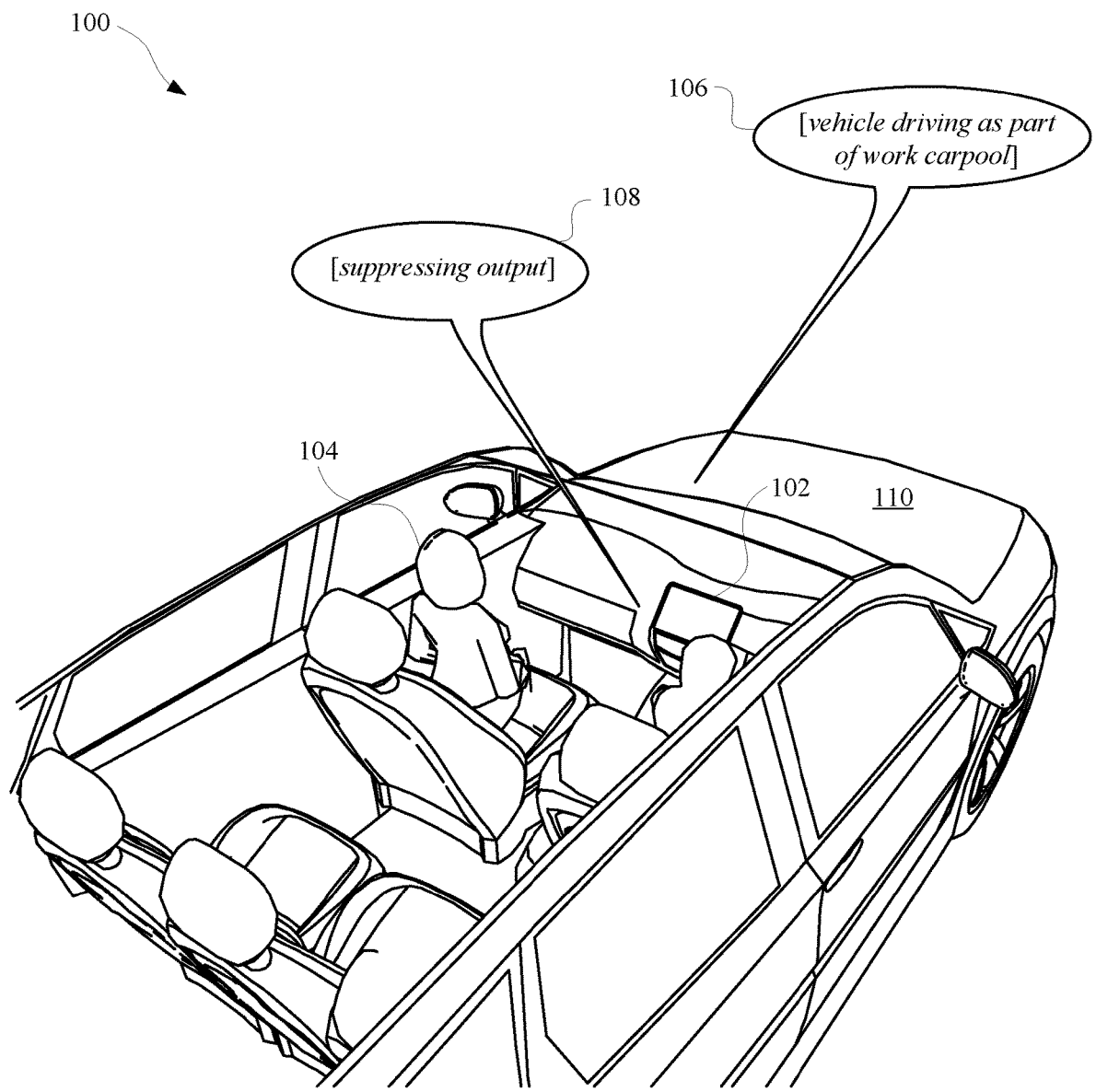
FIG. 1A, FIG. 1B, FIG. 1C, and FIG. 1D illustrate views of a computing device that provides an output for suppressing responsiveness of other automated assistants.

FIG. 1A, FIG. 1B, FIG. 1C, and FIG. 1D illustrate a view 100, a view 120, a view 140, and a view 160 of a computing device that provides an output for suppressing responsiveness of other automated assistants. The output can be rendered by the computing device for another computing device in order to delegate an automated assistant, that is accessible via the computing device, as exclusively responsive to assistant commands. The computing device can render the output when multiple assistant-enabled devices are detected within a particular environment, thereby increasing the probability that multiple automated assistants may be invoked in response to an invocation phrase and/or an automated assistant command that is detected by multiple assistant enabled devices.

As an example, the computing device can be a vehicle computing device 102 that is part of a vehicle 110, and the vehicle computing device 102 can provide access to an automated assistant. A first user 104 that is riding in the vehicle 110 can interact with the automated assistant via one or more interfaces that are in communication with the vehicle computing device 102. For example, the first user 104 can provide a spoken input to the automated assistant to cause the automated assistant to perform one or more actions in furtherance of fulfilling a request embodied in the spoken input. The vehicle computing device 102, and/or any other computing device in communication with the vehicle computing device 102 can provide a suppressive output 108 that can operate to suppress invocation of other automated assistants. In some implementations, the suppressive output 108 can be an audio output that embodies one or more frequencies that are within an inaudible range. In this way, the first user 104 may not be distracted by the suppressive output 108 but can nonetheless rely on the suppressive output 108 to prevent other automated assistants from being invoked by the spoken command from the first user 104.

Figure 1B:
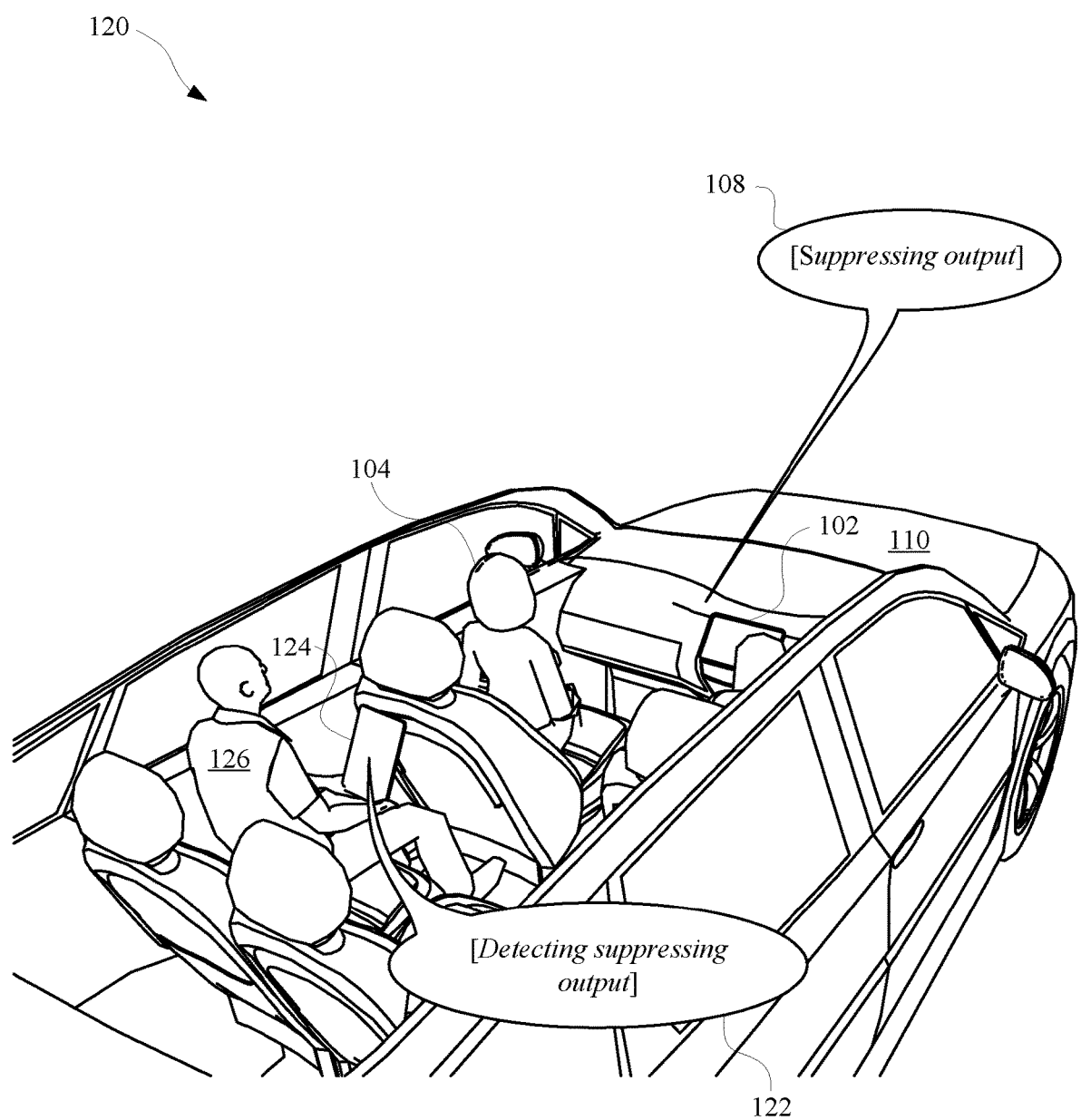
Figure 1C:
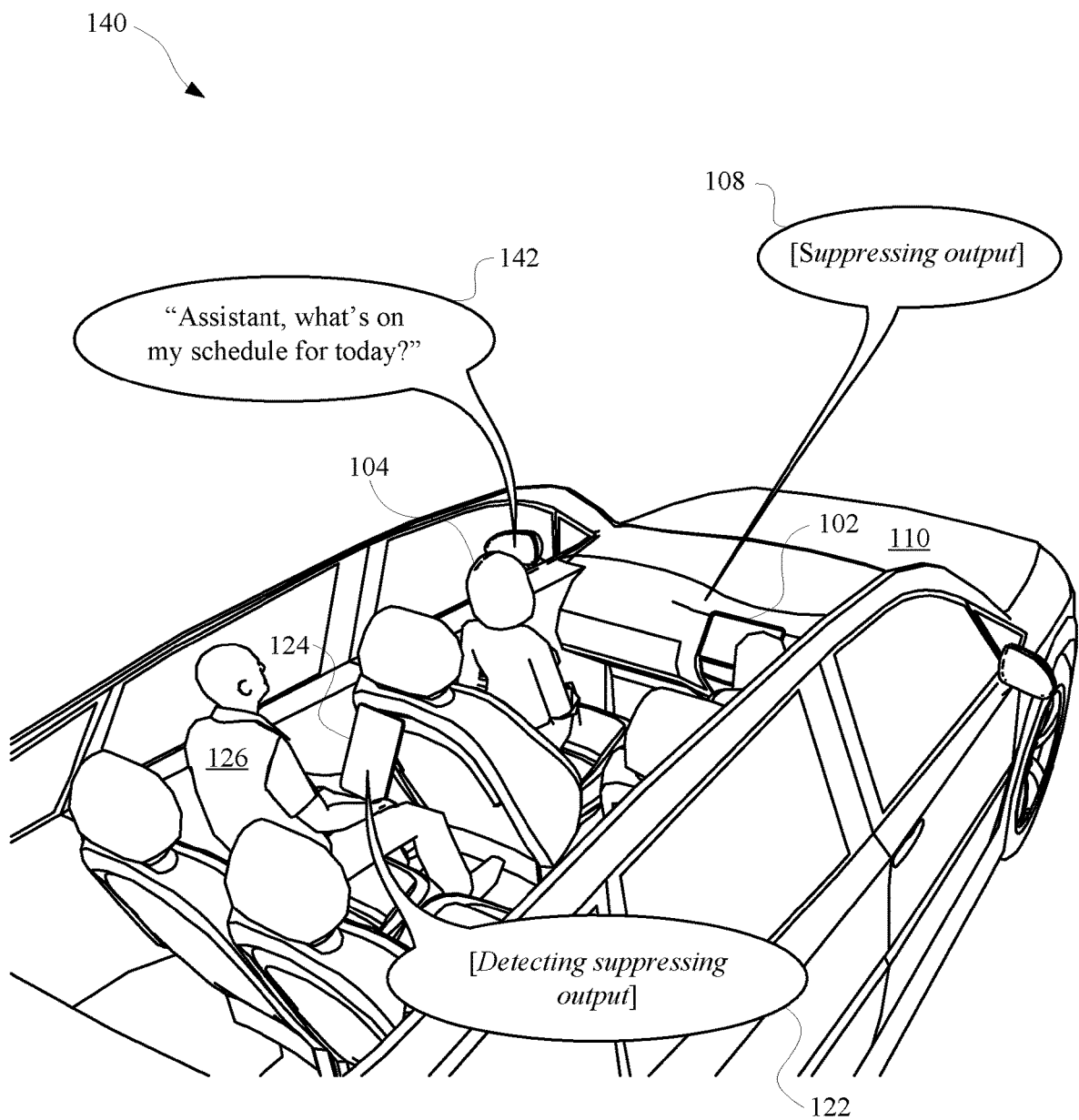

As illustrated in FIG. 1A, the first user 104 can be riding in the vehicle 110 as part of a work carpool arrangement that the first user 104 has with one or more other persons, as indicated by an indication 106. As the first user 104 is traveling in the vehicle 110, the vehicle 110 can stop to pick up another person, such as a second user 126, as illustrated in view 120 of FIG. 1B. FIG. 1B illustrates a view 120 of the second user 126 being seated in a vehicle 110 with a portable computing device 124. The suppressive output 108 can continue to be rendered by the vehicle computing device 102 or another device located in the vehicle 110. The portable computing device 124 can detect the suppressive output 108, as indicated by an indication 122. The portable computing device 124 can detect the suppressive output 108 as the second user 126 is viewing streaming graphical content via a display interface of the portable computing device 124. For example, the portable computing device 124 can include a microphone or other audio interface capable of detecting audio that is within or outside an audible range of frequencies.

In some implementations, the vehicle computing device 102 can provide access to an instance of an automated assistant and the portable computing device 124 can provide access to another instance of the automated assistant. Each instance of the automated assistant can be associated with a separate user account. Alternatively, the vehicle computing device 110 can provide access to a first automated assistant that is provided by an entity, and the portable computing device 124 can provide access to a second automated assistant that is provided by a different entity.

When the portable computing device 124 detects the suppressive output 108, the portable computing device 124 can render an indication that the suppressive output 108 has been detected, or, alternatively, the portable computing device 124 can bypass rendering this indication. Based on detecting the suppressive output 108, an automated assistant that is accessible via the portable computing device 124 can refrain from being invoked, or otherwise perform one or more responsive actions, in response to any spoken command. For example, and as illustrated in view 140 of FIG. 1C, the first user 104 can provide spoken command 142 to an automated assistant of the vehicle computing device 102 while the portable computing device 124 is detecting the suppressive output 108.

The spoken command 142 can be, for example, "Assistant, what's on my schedule for today?" Although this spoken command 142, if provided by the second user 126 to the portable computing device 124, would otherwise cause the portable computing device 124 to provide a response— an automated assistant accessible via a portable computing device 124 can limit processing associated with responding to the spoken command 142 based on the suppressive output 108. In this way, the second user 126 can reliably view their streaming media without having to change settings manually in order to limit responsiveness of their respective automated assistant. This can preserve computational resources that might otherwise be consumed when the portable computing device 124 is caused to incidentally initialize one or more actions, or accidentally pause an ongoing action that was interrupted by the spoken command 142.

Figure 1D:
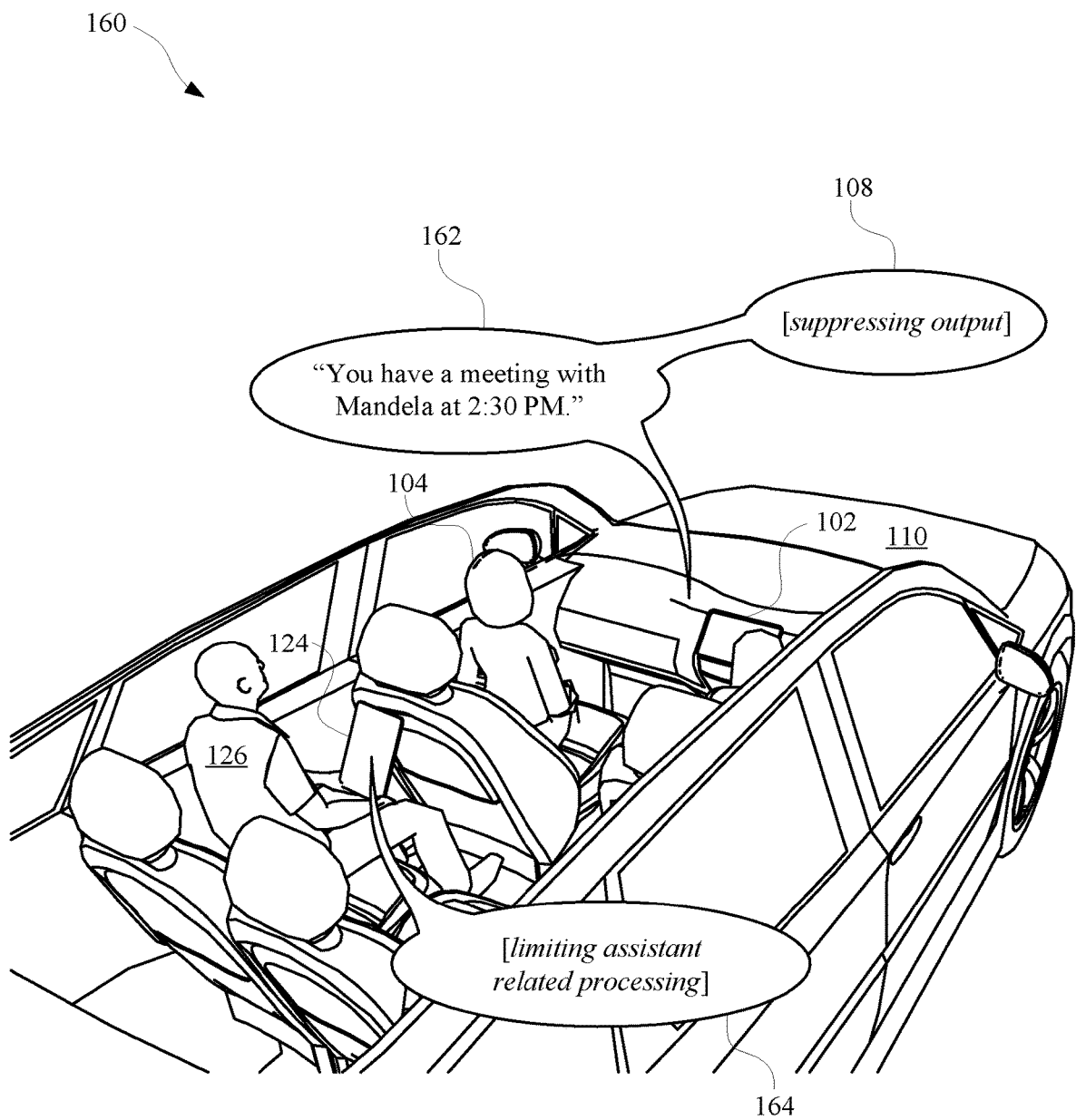

As illustrated in view 160 of FIG. 1D, the automated assistant that is accessible via the vehicle computing device 102 can provide a responsive output 162 such as, "You have a meeting with Mandela at 2:30 pm." The responsive output 162 can be provided in response to the spoken command 142 and can be provided simultaneous to the suppressive output 108. In other words, audio data generated by the vehicle computing device 102 can embody natural language content of the response and output 162, as well as the suppressive output 108 that causes the other automated assistant to not be invoked. The other automated system, which is accessible via the portable computing device 124, can bypass invoking the automated assistant, as characterized by the indication 164. Rather, the portable computing device 124 can continue rendering streaming media for the second user 126 without interruption, or at least without the other automated assistant being invoked in furtherance of fulfilling a request embodied in the spoken command 142.

In some implementations, a vehicle computing device can refer to a computing device, such as a portable computing device, that is located within the vehicle 110 and is in communication with a separate computing device that is integral with the vehicle 110. For example, the first user 104 can enter the vehicle 110 with a cellular phone, which can pair with the vehicle computing device. The cellular phone can provide access to an automated assistant but can communicate with the vehicle computing device in order to provide outputs via one or more different modalities of the vehicle 110.

In some implementations, the suppressive output 108 can be dynamic and can embody information characterizing a status of the vehicle computing device 102, the automated assistant, and/or any other application or apparatus associated with the vehicle computing device 102. For example, in response to the automated assistant detecting the spoken command 142, the vehicle computing device 102 or the automated assistant can cause an output to be rendered that indicates the vehicle computing device 102 will initialize performance of one or more actions in furtherance of fulfilling a request embodied in the spoken command 142. In some implementations, the portable computing device 124 can detect the spoken command 142 and the suppressive output 108, and await acknowledgement from the vehicle computing device 102 that the vehicle computing device 102 will respond to the spoken command 142.

If the portable computing device 124 does not receive the acknowledgement from the vehicle computing device 102, or another device providing the suppressive output 108, the portable computing device 124 or the other automated assistant can respond to the spoken command 142. For example, the portable computing device 124 can render an output that prompts a user regarding whether the other automated assistant should respond to the spoken command 142. If the second user 126 were to receive this rendered output based on the vehicle computing device 102 not providing the acknowledgement, the second user 126 can respond to the prompt and cause the other automated assistant to respond to the spoken command 142. In some implementations, another responsive output provided by the other automated assistant can be the same as, or different than, the responsive output 162 rendered by the automated assistant and/or the vehicle computing device 102.

Figure 2:
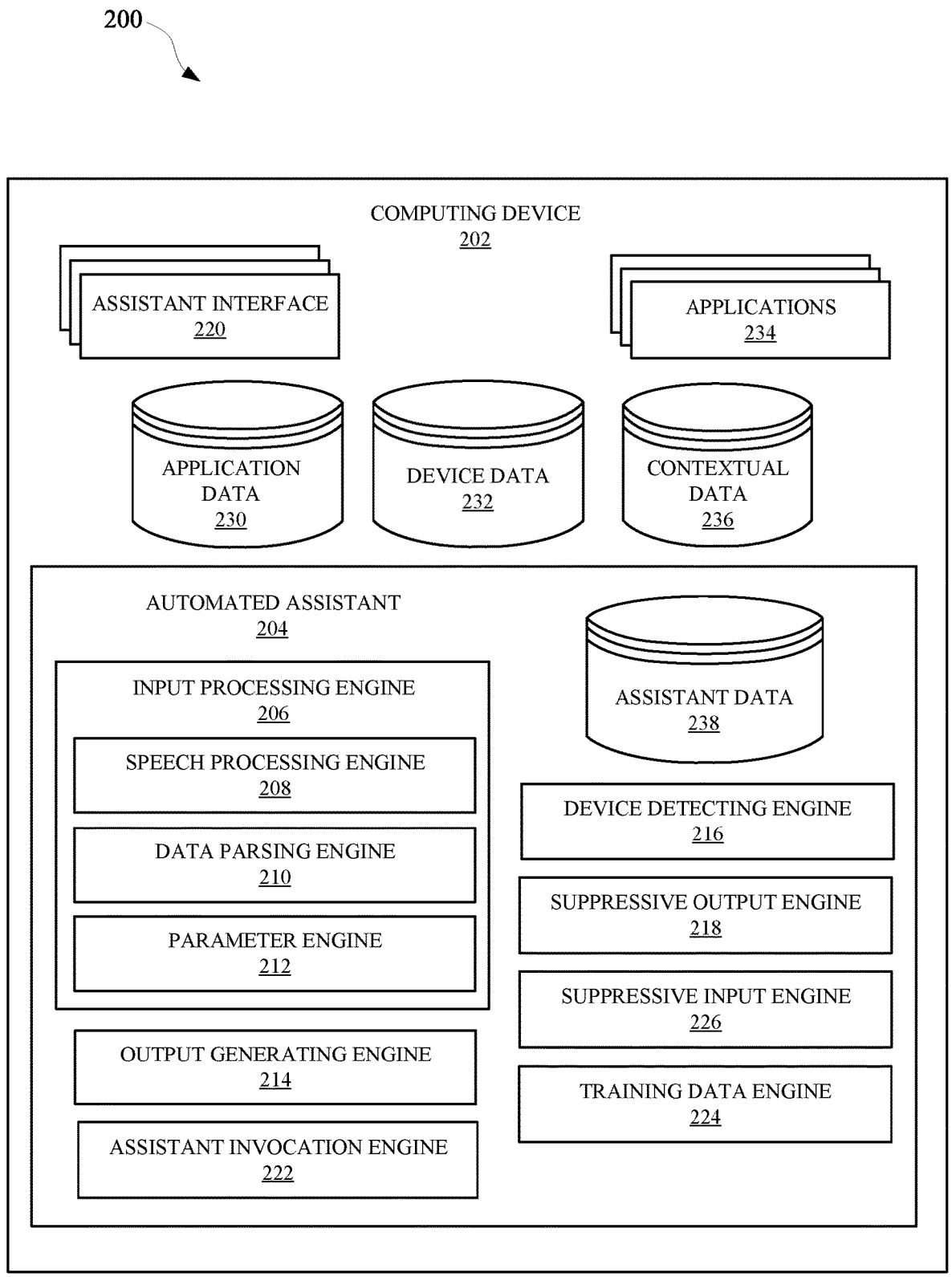
FIG. 2 illustrates a system for providing and/or detecting an automated assistant suppressing output for limiting responsiveness of an automated assistant.

FIG. 2 illustrates a system for providing and/or detecting an automated assistant suppressing output for limiting responsiveness of an automated assistant. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to perform a function (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the automated assistant 204 can optionally include a training data engine 224 for generating training data, with prior permission from the user, based on interactions between the automated assistant 204 and the user. The training data can characterize instances in which the automated assistant 204 may have initialized without being explicitly invoked via a spoken invocation phrase, and thereafter the user either provided an assistant command/or did not provide an assistant command within a threshold period of time. In some implementations, the training data can be shared, with prior permission from the user, with a remote server device that also receives data from a variety of different computing devices associated with other users. In this way, one or more trained machine learning models can be further trained in order that each respective automated assistant can employ a further trained machine learning model to better assist the user, while also preserving computational resources.

In some implementations, the automated assistant 204 can optionally include a device detecting engine 216 that can be used to process application data 230, device data 232, and/or contextual data 236 in order to determine whether another device is present in an environment. For example, the device data 232 and/or contextual data 236 can include data captured using one or more sensors of the computing device 202. This data can characterize one or more connections between the computing device 202 and one or more devices and/or one or more networks. Based on this data, the computing device 202 can determine that another assistant-enabled device is present in an environment with the computing device 202. Additionally, or alternatively, contextual data 236 can be processed by the device detecting engine 216 to determine, with prior permission from a user, whether another device is present in the environment based on any output from another device. For example, the contextual data 236 can include data that is captured using one or more sensors of the computing device 202. The sensors can be used to detect audio, graphical, wireless, and/or haptic output from another device. The device detecting engine 216 can use this determine regarding the presence of another device to cause the computing device 202 to render and/or cease rendering an automated assistant suppressing output.

In some implementations, the automated assistant 204 can optionally include a suppressive output engine 218. The suppressive output engine 218 can, with prior permission from a user, generate data for the computing device 202 to use as a basis for rendering an automated assistant suppressing output. The suppressive output engine 218 can determine data that is to be embodied in the automated assistant suppressing output and/or a modality via which the automated assistant suppressing output is to be rendered. For example, the suppressive output engine 218 can determine one or more frequencies that are to be embodied in an audio output for suppressing any assistant-enabled device that is located in an environment with the computing device 202. Additionally, or alternatively, the suppressive output engine 218 can determine information to be embodied in a suppressive output to another device. For example, the suppressive output engine 218 can generate a request for each receiving device to limit invocation of their respective automated assistant while an automated assistant suppressing output is being rendered by the computing device 202.

In some implementations, the automated assistant suppressing output can cause another device that receives the output to limit certain processing in response to receiving the automated assistant suppressing output. The certain processing that can be limited can be identified in data embodied in the rendered output. For example, the automated assistant suppressing output can cause processing involved in invocation phrase detection to be limited, thereby reducing an amount of audio processing that is occurring at an assistant-enabled device that is detecting the rendered output from the computing device 202. In some implementations, the automated assistant suppressing output can cause speech to text processing at a receiving device to be limited, and/or transmission of audio data to a remote server device for processing to be limited. Such limitations on processing can be established for an entire duration of the computing device 202 rendering the automated assistant suppressing output, and/or as long as a particular device is detecting the automated assistant suppressing output.

In some implementations, the automated assistant 204 can optionally include a suppressive input engine 226. The suppressive input engine 226 can be employed by the automated assistant 204 to determine how to respond when an automated assistant suppressing output is being rendered by another device. In order to detect such a rendered output, the suppressive input engine 226 can process audio data using an analog or digital bandpass filter. Additionally, or alternatively, in order to detect the rendered output, the suppressive input engine 226 can process audio data, graphical data, haptic data, wirelessly transmitted data, and/or any other data that can be accessible to the computing device 202. Based on this processing, the suppressive input engine 226 can cause the computing device 202 to limit one or more types of processing at the computing device 202 or another computing device (e.g., a server device that is in communication with the computing device 202).

Figure 3:
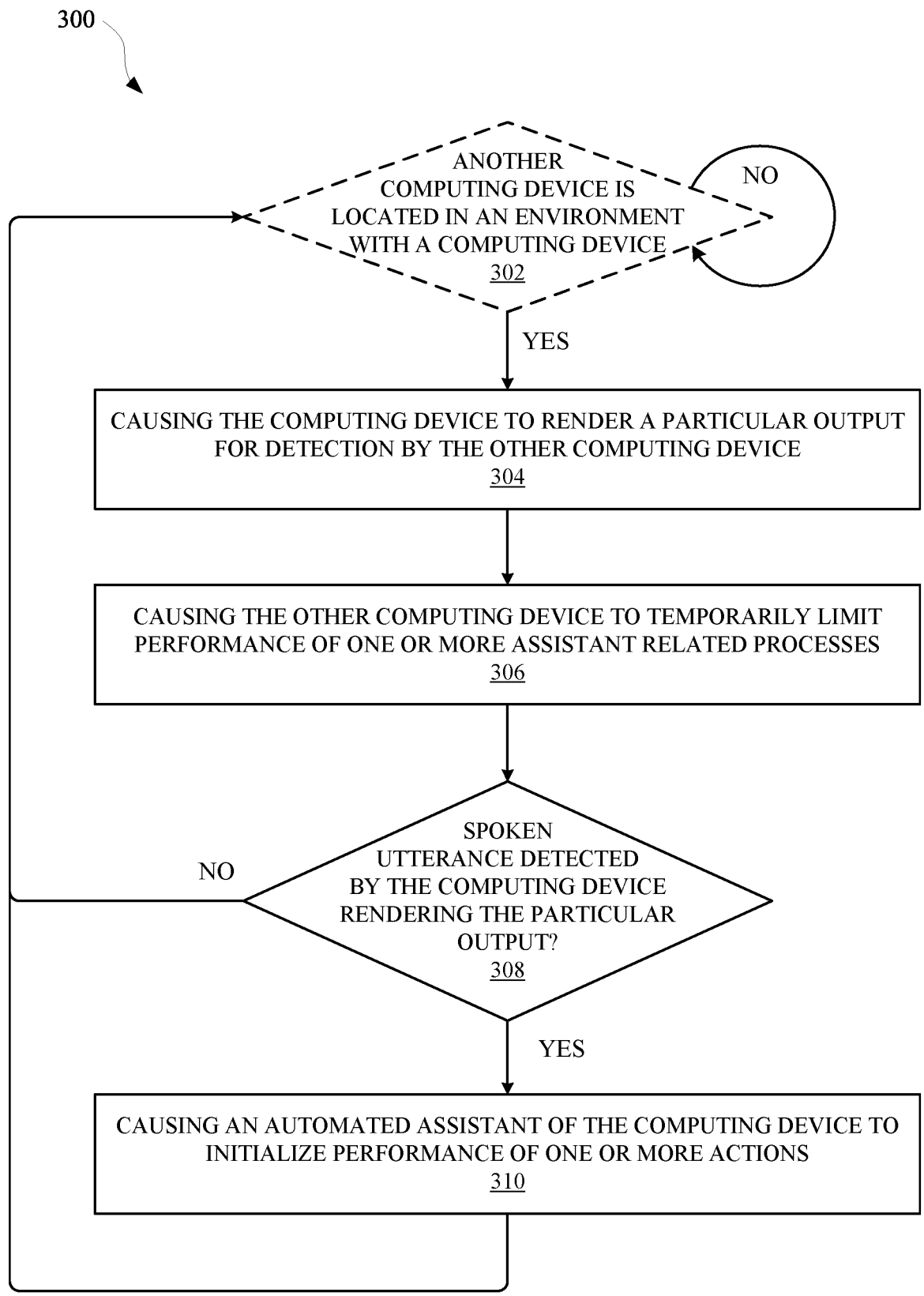
FIG. 3 illustrates a method for suppressing invocation of other automated assistants using a rendered output from a computing device, which is delegating itself as responsive to spoken utterances from a user.

FIG. 3 illustrates a method 300 for suppressing invocation of other automated assistants using a rendered output from a computing device that is delegating itself as exclusively responsive to spoken utterances from a user in an environment. The method 300 can be performed by one or more applications, devices, and/or any other apparatus or module capable of interacting with an automated assistant. The method 300 can include an optional operation 302 of determining whether one or more other computing devices are located in an environment with the computing device. The computing device can be a main computing device that a user may desire to assign responsibility for responding to spoken utterances instead of other computing devices. Alternatively, or additionally, the computing device can be a main computing device that one or more other computing devices are connected to, such as a vehicle computing device that allows for one or more devices to pair with the vehicle computing device.

When another computing device is determined to be in the environment with the computing device, the method can proceed from the operation 302 to an operation 304. Otherwise, the computing device can continue to monitor for other computing devices within the environment. In some implementations, the operation 302 can be an optional operation, and therefore the computing device can render a suppressive output regardless of whether another computing device is detected within the environment. The operation 304 can include causing a particular output to be rendered for detection by the other computing device that was detected within the environment. In some implementations, the rendered output can be provided via one or more interfaces of the computing device. For example, the rendered output can be provided via a display interface, an audio interface such as a speaker, a haptic interface, and/or any other interface that can be in communication with a computing device.

When the rendered output is provided via an audio interface, the rendered output can be an inaudible sound that embodies data that, when processed by the other computing device, suppresses invocation of an automated assistant that is accessible via the other computing device. In some implementations, the rendered suppressive output can be provided by the computing device independent of whether the computing device and/or an automated assistant detected an invocation phrase and/or a spoken command. For instance, the rendered suppressive output can be provided regardless of whether a user provided an invocation phrase (e.g., "Assistant") within a period of time from when the computing device initialized rendering of the suppressive output. In other words, rendering of an assistant suppressing output can be performed regardless of, or unresponsive to, the user providing a spoken utterance to the computing device rendering the suppressive output.

The operation 300 can proceed from the operation 304 to an operation 306, which can include causing the other computing device to temporarily limit performance of one or more assistant related processes. For instance, the assistant related processes can include processing of certain audio data associated with invoking an automated assistant. In other words, because the computing device is rendering the particular output that suppresses invocation of the automated assistant, certain automated assistant processes will not be performed, even when a user is providing a spoken utterance to the other computing device(s).

The method 300 can proceed from the operation 306 to an operation 308, which can include determining whether a spoken utterance was detected by the computing device. When a spoken utterance is detected by the computing device, the method 300 can proceed from the operation 308 to an operation 310. Otherwise, when a spoken utterance is not detected by the computing device, the computing device can continue to monitor for spoken utterances and/or return to the operation 302 or the operation 304. The operation 310 can include causing an automated assistant of the computing device to initialize performance of one or more actions in furtherance of fulfilling a request embodied in the spoken utterance. In this way, the spoken utterance will not affect other computing devices inadvertently, thereby preserving computational resources that might otherwise be consumed when other devices are accidentally invoked by a spoken utterance.

Figure 4:
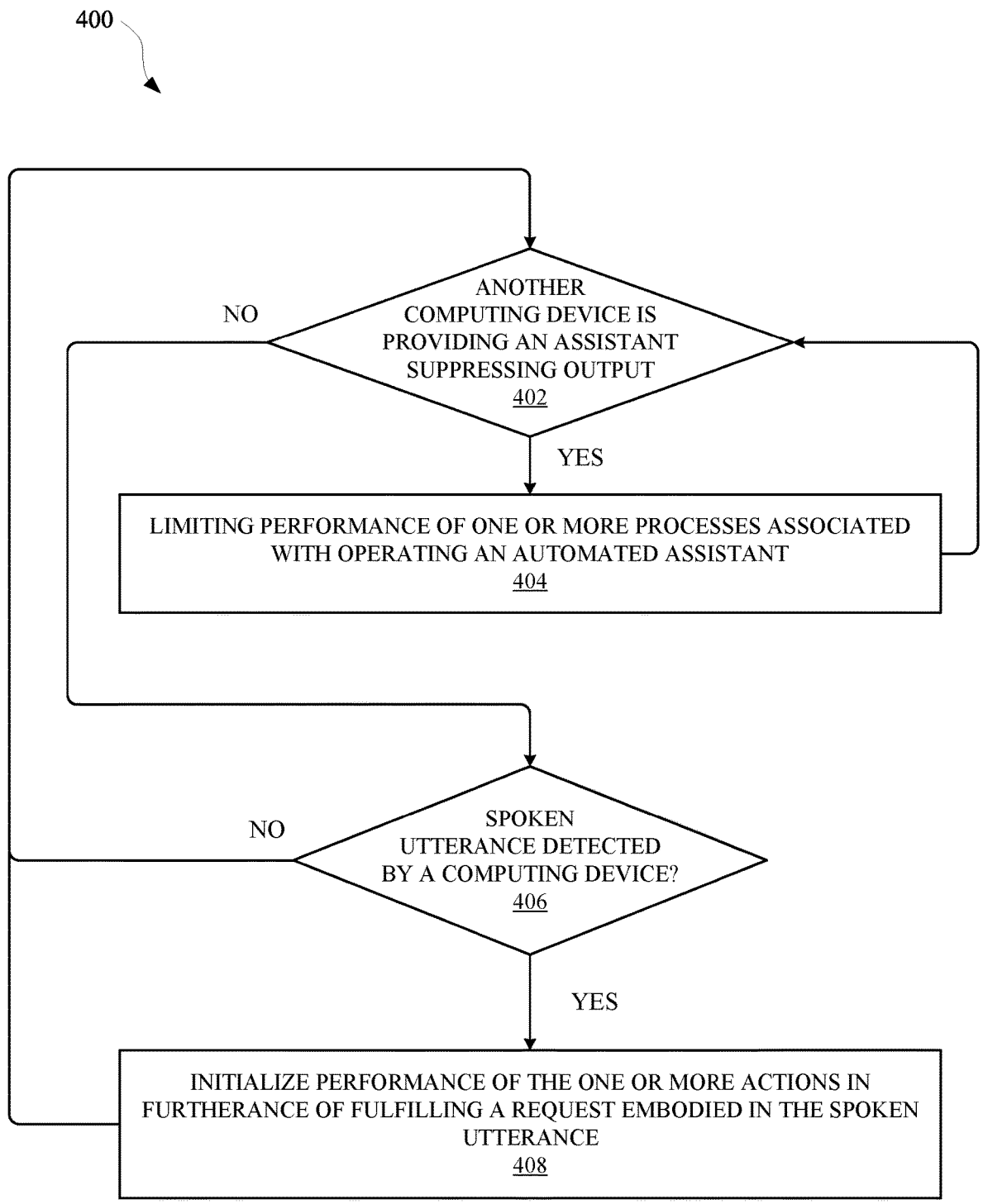
FIG. 4 illustrates a method for suppressing responsiveness of an automated assistant based on a rendered output from another computing device that is attempting to delegate itself as exclusively responsive to assistant commands from a user.

FIG. 4 illustrates a method 400 for suppressing responsiveness of an automated assistant based on a rendered output from another computing device that is attempting to delegate itself as exclusively responsive to assistant commands from a user. The method 400 can be performed by one or more computing devices, applications, and/or any other apparatus or module capable of interacting with another computing device. The method 400 can include an operation 402 of determining whether another computer device is providing an assistant suppressing output. The assistant suppressing output can be an output rendered by another computing device in order to prevent other automated assistants from being invoked in response to a spoken utterance, at least while the other computing device is providing the assistant suppressing output. When the other computing device, such as another assistant enabled device or a standalone interface device, is determined to be providing the assistant suppressing output, the method 400 can proceed from the operation 402 to an operation 404. However, when an assistant suppressing output is not detected by the computing device, the method 400 can proceed from the operation 402 to an operation 406.

In some implementations, the operation 404 can include limiting and/or preventing processing of data at the computing device based on detecting the assistant suppressing output. For example, limiting processing of data can include temporarily not processing, at the computing device, audio data in furtherance of determining whether an invocation phrase (e.g., "Assistant") or other spoken utterance has been directed to an automated assistant. In some implementations, limiting and/or preventing processing of data can include temporarily not processing, at the computing device, sensor data for determining whether a user is intending to invoke the automated assistant and/or is predicted to invoke the automated assistant within a forthcoming period of time. In some implementations, limiting and/or preventing processing of data based on detecting the assistant suppressing output can include temporarily not buffering audio data for detecting an invocation phrase and/or temporarily disabling a microphone of one or more devices.

The method 400 can include the operation 406 of determining whether a spoken utterance has been detected by the computing device. The spoken utterance can be an invocation phrase and/or a spoken command from a user to an automated assistant that is accessible via the computing device or a separate apparatus. The user can provide the spoken command within an environment that includes a computing device and/or one or more other assistant enabled devices. When a spoken utterance is detected by the computing device, the method 400 can proceed from the operation 406 to an operation 408. Otherwise, when no spoken utterance is detected, the computing device can continue to monitor for the assistant suppressing output. In some implementations, the computing device can monitor for a cancelation output, which can operate to cancel out any effect of the assistant suppressing output. For example, the computing device can detect a canceling output after detecting the assistant suppressing output. In response, the computing device can continue to perform one or more operations that were previously limited in response to the assistant suppressing output. For instance, the computing device can re-initialize monitoring for invocation phrases from the user, if the computing device had previously been limiting such monitoring.

In some implementations, the assistant suppressing output can be an audio output from the other computing device or another apparatus capable of rendering audio from an audio interface (e.g., a speaker). The rendered audio can include a frequency composition that includes one or more frequencies that are greater than or equal to a frequency that is inaudible by the user. In some implementations, the rendered audio and/or other assistant suppressing output can be selected by the other computing device based on an environment in which the other computing device is rendering the output. For example, the rendered output can embody data and/or a frequency composition that is selected based on an occupancy of the environment, a size of the environment, a time of day, a type of application executing at another computing device, a geographic location of the environment, and/or any other feature that can be associated with an environmental characteristic. Additionally or alternatively, the rendered output can embody data and/or a frequency composition that is selected based on characteristics of one or more devices that are located in an environment with the computing device that is providing the rendered output. For example, the other computing device can detect properties of one or more devices and determine a type of assistant suppressive output to render based on the detected properties. The properties can include a location of one or more devices, an interface that is available at the one or more devices, a size and/or shape of the one or more devices, an amount of battery charge left at the one or more devices, an account associated with the one or more devices, a state of the one or more devices, a state of an application of the one or more devices, and/or any other property that can be associated with a device.

For example, the other computing device can render an audio output that includes frequencies that do not include a highest amplitude frequency identified in a rendered audio output of a device in the environment. In some implementations, when the computing device detects an assistant suppressing output from the other computing device, the computing device can provide a responsive output and/or acknowledgement output to the other computing device. For example, when the computing device detects an assistant suppressing output that is inaudible to a human, the computing device can provide a responsive output that is also inaudible to a human. The responsive output can provide an indication to the other computing device that the computing device is limiting certain processing of input data based on detecting the assistant suppressing output from the other computing device.

In some implementations, the assistant suppressing output rendered by the other computing device can cause the computing device to limit processing of certain data by the computing device. For example, in some implementations, the assistant suppressing output can cause the computing device to at least temporarily limit invocation phrase detection at the computing device. As a result, while the computing device is detecting the rendered output from the other computing device, the computing device would be unresponsive to invocation phrases (e.g., "Assistant") from the user. In some implementations, the assistant suppressing output can cause the computing device to at least temporarily limit speech to text processing while the computing device is detecting the assistant suppressing output. In some implementations, the assistant suppressing output can cause the computing device to at least temporarily limit transmitting input data to a remote server for further processing as long as the computing device is detecting the assistant suppressing output. In some implementations, the assistant suppressing output can cause the computing device to at least temporarily limit certain types of processing of data at the computing device for an entire duration of the other computing device rendering the assistant suppressing output. In some implementations, the computing device can employ a bandpass filter in order to detect the assistant suppressing output. In some implementations, the assistant suppressing output can cause the computing device to temporarily limit certain processing of data for a period of time that is based on one or more properties of the computing device. For example, the assistant suppressing output can limit processing of certain data for an amount of time that is selected based on battery charge of the computing device, contextual data characterizing a context of the computing device, sensor data from one or more sensors in communication with the computing device, and/or any other property that can be associated with the computing device.

When the computing device is detecting the assistant suppressing output, the other computing device can detect a spoken utterance from the user. The spoken utterance can include assistant command such as, "Assistant, show me my front porch camera," which can be a request from a user who is attempting to view streaming video footage of their front porch. The spoken utterance can be provided by a user that is performing a demo of a piece of hardware that is controllable by the other computing device. Therefore, the user would not intend for a variety of different computing devices (e.g., devices of audience members) to respond to the spoken utterance, since that would consume a variety of computational resources such as network bandwidth, battery charge of various devices, processing bandwidth, and/or a variety of other computational resources. Furthermore, the invocation of other computing devices would distract from the presentation being performed by the user.

When an assistant suppressing output is not detected by the computing device and the computing device detects a spoken utterance, the method 400 can proceed from the operation 406 to an operation 408. The operation 408 can include initializing performance of the one or more actions in furtherance of fulfilling a request embodied in the spoken utterance. For example, when the spoken utterance is "Assistant, show me my front porch camera," the computing device can perform one or more actions in furtherance of providing streaming video based on video captured by a front porch camera owned by the user. Thereafter, the method 400 can proceed from the operation 408 and return to the operation 402, in order to continue detecting spoken utterances and/or an assistant suppressing output.

Figure 5:
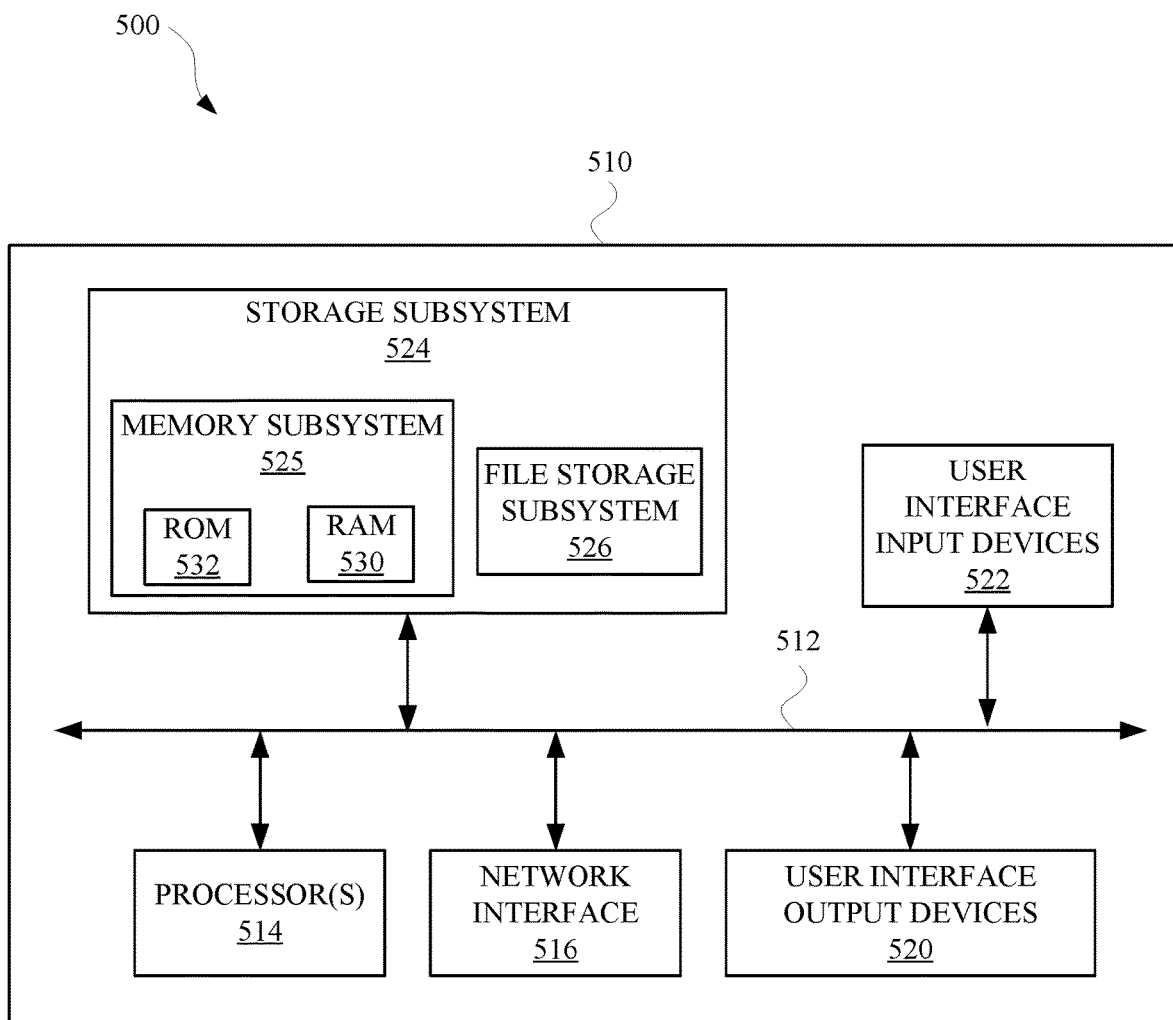
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, method 400, and/or to implement one or more of system 200, vehicle computing device 102, vehicle 110, portable computing device 124, automated assistant, computing device, server device, and/or any other application, device, apparatus, and/or module discussed herein.

These software modules are generally executed by processor 514 alone or in combination with other processors. Memory 525 used in the storage subsystem 524 can include a number of memories including a main random access memory (ram) 530 for storage of instructions and data during program execution and a read only memory (rom) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, zip code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as causing, by a first computing device and independent of any detection of invocation phrase by the first computing device, the first computing device to render an audio output via one or more speakers coupled to the first computing device, wherein the particular audible output is audibly detectable by one or more microphones of a second computing device located in an environment with the first computing device, and wherein, responsive to the particular audible output being detected at the second computing device by the one or more microphones, the second computing at least temporarily limits performance of certain processing of audio data detected at the second computing device. The method can further include an operation of subsequent to causing the first computing device to render the particular audible output, and while the second computing device is limiting performance of the certain processing of audio data: determining, by the first computing device, that a user has provided a spoken utterance to an automated assistant that is accessible via the first computing device, wherein the spoken utterance corresponds to a request for the automated assistant to perform one or more actions. The method can further include an operation of causing, by the first computing device and in response to the spoken utterance, the automated assistant to initialize performance of the one or more actions, wherein, based on temporarily limiting performance of the certain processing of audio data, the second computing device does not initialize performance of the one or more actions in response to the spoken utterance.

In some implementations, the method can further include an operation of determining that the second computing device is located within the environment, and determining that the second computing device provides access to the automated assistant or another automated assistant. In some implementations, causing the first computing device or the other computing device to render the audio output includes: causing the first computing device or the other computing device to provide the audio output as embodying one or more different waveforms. In some implementations, causing the first computing device or the other computing device to render the audio output includes: selecting, based on a characteristic of the second computing device, a frequency of a signal embodied by the audio output, or an irregular waveform embodied by the audio output.

In some implementations, the characteristic of the second computing device includes a user account that is associated with an application that is available at the second computing device. In some implementations, causing the first computing device or the other computing device to render the audio output includes: selecting, based on a characteristic of the environment, a frequency of a signal embodied by the audio output. In some implementations, causing the second computing device to temporarily limit performance of the one or more actions includes: causing the second computing device to render a separate output indicating that the second computing device detected the spoken utterance from the user. In some implementations, the separate output is a selectable element that is rendered at a graphical user interface of the second computing device.

In some implementations, the first computing device or second computing device provides access to an assistant setting that is modifiable by the user or another user for eliminating an effect of the audio output on the second computing device. In some implementations, the assistant setting controls an ability of the second computing device to initialize the one or more actions in response to the user providing the spoken utterance or another spoken utterance. In some implementations, the method can further include an operation of determining, by the first computing device, whether the second computing device or a separate computing device is rendering a separate particular output in furtherance of causing the automated assistant to be unresponsive to one or more inputs from the user to the first computing device.

In some implementations, causing the first computing device or another computing device to render the audio output is performed when the second computing device or the separate device is determined to not be rendering the separate particular output. In some implementations, the method can further include an operation of, when the second computing device or the separate device is determined to be rendering the separate particular output: causing the first computing device or the other computing device to render the audio output includes: selecting, based on the separate particular output, a particular frequency of the signal embodied by the particular output, wherein the particular frequency is different from the frequency selected when the second computing device or the separate device is determined to not be rendering the separate particular output.

In some implementations, wherein the certain processing of the audio data that is limited by the second computing device comprises invocation phrase detection processing. In some implementations, the certain processing of the audio data that is limited by the second computing device comprises speech to text processing. In some implementations, the certain processing of the audio data that is limited by the second computing device comprises transmitting the audio data to a remote server. In some implementations, the second computing prevents performance of the certain processing of audio data detected at the second computing device during an entire duration that the audible output is detected at the second computing device. In some implementations, the second computing device detects the particular audible output by processing the audio data using an analog or digital band pass filter.

In other implementations, a method implemented by one or more processors is set forth as including operations such as processing, at a first computing device, audio data that is detected via one or more microphones of the first computing device and that captures an audible output rendered by one or more speakers coupled to a second computing device, wherein the first computing device and the second computing device are located in an environment, wherein the audible output is caused to be rendered, by the second computing device, independent of detection of any invocation phrase by the second computing device, and wherein the first computing device provides access to an automated assistant. The method can further include an operation of determining, based on processing the audio data, that the output data indicates that the second computing device is attempting to suppress responsiveness of one or more automated assistants that are accessible via one or more assistant-enabled devices that are capable of detecting the audio data from the second computing device, wherein the one or more automated assistants include the automated assistant and the one or more assistant-enabled devices include the first computing device. In some implementations, the method can further include an operation of responsive to determining that the audio data indicates that the second computing device is attempting to suppress responsiveness of any other automated assistant: limiting, by the first computing device, performance of certain further processing of further audio data detected at the second computing device by the one or more microphones.

In some implementations, the automated assistant is a first instance of an automated assistant and the second automated assistant provides access to a second instance of the automated assistant. In some implementations, the method can further include an operation of subsequent to determining that the output data indicates that the second computing device is attempting to suppress responsiveness of any other automated assistant: determining whether the second computing device responded to the spoken utterance from the user. In some implementations, determining whether the second computing device responded to the spoken utterance from the user includes: processing, by the first computing device, additional output data that characterizes an additional indication that the second computing device received, or responded to, the spoken utterance from the user.

In yet other implementations, a method implemented by one or more processors is set forth as including operations such as determining, by a vehicle computing device, that a portable computing device is located within the vehicle, wherein the vehicle computing device and the portable computing device are located within a vehicle, and the portable computing device is brought inside of the vehicle by a user. The method can further include an operation of causing, by the vehicle computing device and in response to determining that the portable computing device is located within the vehicle, the vehicle computing device or another computing device to render a particular output, wherein the particular output is detectable by the portable computing device and causes the portable computing device to at least temporarily limit responsiveness of any automated assistant that is accessible via the portable computing device. The method can further include an operation of, subsequent to causing the vehicle computing device or the other computing device to render the particular output: determining, by the vehicle computing device, that the user has provided a spoken utterance to an automated assistant that is accessible via the vehicle computing device, wherein the spoken utterance corresponds to a request for the automated assistant to perform one or more actions. The method can further include an operation of causing, by the vehicle computing device and in response to the spoken utterance, the automated assistant to initialize performance of the one or more actions.

In some implementations, determining that the portable computing device is located within the vehicle includes: determining, by the vehicle computing device, that the portable computing device provides access to the automated assistant or another automated assistant. In some implementations, causing the vehicle computing device or the other computing device to render the particular output includes: causing the vehicle computing device or the other computing device to provide an audio output that embodies multiple different frequencies that are greater than 20 kilohertz. In some implementations, causing the vehicle computing device or the other computing device to render the particular output includes: selecting, based on a characteristic of the portable computing device, a frequency of a signal embodied by the particular output.

In some implementations, the characteristic of the portable computing device includes a user account that is associated with an application that is available at the portable computing device. In some implementations, causing the vehicle computing device or the other computing device to render the particular output includes: selecting, based on a characteristic of the vehicle, a frequency of a signal embodied by the particular output. In some implementations, causing the portable computing device to temporarily limit performance of the one or more actions includes: causing the portable computing device to render a separate output indicating that the portable computing device detected the spoken utterance from the user. In some implementations, the separate output is a selectable element that is rendered at a graphical user interface of the portable computing device. In some implementations, the vehicle computing device or portable computing device provides access to an assistant setting that is modifiable by the user or another user for eliminating an effect of the particular output on the portable computing device.

In some implementations, the assistant setting controls an ability of the portable computing device to initialize the one or more actions in response to the user providing the spoken utterance or another spoken utterance. In some implementations, the method can further include an operation of determining, by the vehicle computing device, whether the portable computing device or a separate computing device is rendering a separate particular output in furtherance of causing the automated assistant to be unresponsive to one or more inputs from the user to the vehicle computing device. In some implementations, causing the vehicle computing device or another computing device to render the particular output is performed when the portable computing device or the separate device is determined to not be rendering the separate particular output. In some implementations, the method can further include an operation of, when the portable computing device or the separate device is determined to be rendering the separate particular output: causing the vehicle computing device or the other computing device to render the particular output includes: selecting, based on the separate particular output, a particular frequency of the signal embodied by the particular output, wherein the particular frequency is different from the frequency selected when the portable computing device or the separate device is determined to not be rendering the separate particular output.

We claim:

1. A method implemented by one or more processors, the method comprising:
   causing, by a first computing device and independent of any detection of invocation phrase by the first computing device, the first computing device to render a particular audio output via one or more speakers coupled to the first computing device,
      wherein the particular audio output is inaudible to a human but is audibly detectable by one or more microphones of a second computing device located in an environment with the first computing device, and
      wherein, responsive to the particular audio output being detected at the second computing device by the one or more microphones, the second computing device at least temporarily limits performance of certain processing of audio data, including spoken input, from one or more users, that is detected at the second computing device;
   subsequent to causing the first computing device to render the particular audio output, and while the second computing device is limiting performance of the certain processing of audio data, including the spoken input:
      determining, by the first computing device, that a user has provided a spoken utterance to an automated assistant that is accessible via the first computing device,
         wherein the spoken utterance corresponds to a request for the automated assistant to perform one or more actions; and
      causing, by the first computing device and in response to the spoken utterance, the automated assistant to initialize performance of the one or more actions,
         wherein, based on temporarily limiting performance of the certain processing of audio data, including the spoken input, the second computing device does not initialize performance of the one or more actions in response to the spoken utterance.

2. The method of claim 1, further comprising:
   determining that the second computing device is located within the environment, and
   determining that the second computing device provides access to the automated assistant or another automated assistant.

3. The method of claim 1, wherein causing the first computing device to render the audio output includes:
   selecting, based on a characteristic of the second computing device, a frequency of a signal embodied by the audio output, or an irregular waveform embodied by the audio output.

4. The method of claim 1 wherein causing the first computing device to render the audio output includes:
   selecting, based on a characteristic of the environment, a frequency of a signal embodied by the audio output.

5. The method of claim 1 further comprising:
   determining, by the first computing device, whether the second computing device or a separate computing device is rendering a separate particular output in furtherance of causing the automated assistant to be unresponsive to one or more inputs from the user to the first computing device.

6. The method of claim 5, wherein, when the second computing device or the separate device is determined to be rendering the separate particular output:
causing the first computing device to render the audio output includes:
selecting, based on the separate particular output, a particular frequency of the signal embodied by the particular output,
wherein the particular frequency is different from the frequency selected when the second computing device or the separate device is determined to not be rendering the separate particular output.

7. The method of claim 1, wherein the certain processing of the audio data that is limited by the second computing device comprises invocation phrase detection processing.

8. The method of claim 1, wherein the certain processing of the audio data that is limited by the second computing device comprises speech to text processing.

9. The method of claim 1, wherein the certain processing of the audio data that is limited by the second computing device comprises transmitting the audio data to a remote server.

10. The method of claim 1, wherein the certain processing of audio data detected at the second computing device is prevented during an entire duration that the audio output is detected at the second computing device.

11. A method implemented by one or more processors, the method comprising:
processing, at a first computing device, audio data that is detected via one or more microphones of the first computing device and that captures an audio output rendered by one or more speakers coupled to a second computing device,
wherein the first computing device and the second computing device are located in an environment,
wherein the audio output is inaudible to humans and is caused to be rendered, by the second computing device, independent of detection of any invocation phrase by the second computing device, and
wherein the first computing device provides access to an automated assistant;
determining, based on processing the audio data, that the audio data indicates that the second computing device is attempting to suppress responsiveness of one or more automated assistants that are accessible via one or more assistant-enabled devices that are capable of detecting the audio output from the second computing device,
wherein the one or more automated assistants include the automated assistant and the one or more assistant-enabled devices include the first computing device; and
responsive to determining that the audio data indicates that the second computing device is attempting to suppress responsiveness of any other automated assistant:
limiting, by the first computing device, performance of certain further processing of further audio data, including spoken input, from one or more users, detected at the first computing device by the one or more microphones.

12. The method of claim 11, further comprising:
subsequent to determining that the output data indicates that the second computing device is attempting to suppress responsiveness of any other automated assistant:
determining whether the second computing device responded to the further audio data.

13. The method of claim 12, wherein the further audio data is a spoken utterance from a user and wherein determining whether the second computing device responded to the spoken utterance from the user includes:
processing, by the first computing device, additional output data that characterizes an additional indication that the second computing device received, or responded to, the spoken utterance from the user.

14. A method implemented by one or more processors, the method comprising:
determining, by a vehicle computing device, that a portable computing device is located within the vehicle,
wherein the vehicle computing device and the portable computing device are located within a vehicle, and the portable computing device is brought inside of the vehicle by a user;
causing, by the vehicle computing device and in response to determining that the portable computing device is located within the vehicle, the vehicle computing device or another computing device to render a particular output that is inaudible to humans,
wherein the particular output is detectable by the portable computing device and causes the portable computing device to at least temporarily limit responsiveness of any automated assistant that is accessible via the portable computing device, including limiting, by the portable computing device, performance of certain processing of audio data, including spoken input, from one or more users, detected at the portable computing device; and
subsequent to causing the vehicle computing device or the other computing device to render the particular output:
determining, by the vehicle computing device, that the user has provided a spoken utterance to an automated assistant that is accessible via the vehicle computing device,
wherein the spoken utterance corresponds to a request for the automated assistant to perform one or more actions;
causing, by the vehicle computing device and in response to the spoken utterance, the automated assistant to initialize performance of the one or more actions.

15. The method of claim 14, wherein determining that the portable computing device is located within the vehicle includes:
determining, by the vehicle computing device, that the portable computing device provides access to the automated assistant or another automated assistant.

16. The method of claim 14, wherein causing the vehicle computing device or the other computing device to render the particular output includes:
causing the vehicle computing device or the other computing device to provide an audio output that embodies multiple different frequencies that are greater than 20 kilohertz.

17. The method of claim 14, wherein causing the vehicle computing device or the other computing device to render the particular output includes:

selecting, based on a characteristic of the portable computing device, a frequency of a signal embodied by the particular output.

18. The method of claim 14, wherein causing the vehicle computing device or the other computing device to render the particular output includes:
selecting, based on a characteristic of the vehicle, a frequency of a signal embodied by the particular output.

19. The method of claim 14, further comprising:
determining, by the vehicle computing device, whether the portable computing device or a separate computing device is rendering a separate particular output in furtherance of causing the automated assistant to be unresponsive to one or more inputs from the user to the vehicle computing device.

20. The method of claim 19, wherein, when the portable computing device or the separate device is determined to be rendering the separate particular output:
causing the vehicle computing device or the other computing device to render the particular output includes:
selecting, based on the separate particular output, a particular frequency of the signal embodied by the particular output,
wherein the particular frequency is different from the frequency selected when the portable computing device or the separate device is determined to not be rendering the separate particular output.

* * * * *